Oct. 12, 1948.    W. H. HUTTER    2,451,221
WEDGED NEEDLE TYPE PHONOGRAPH PICKUP
Filed Oct. 30, 1944    2 Sheets-Sheet 1

INVENTOR.
William H. Hutter,
BY
Zabel, Carlson, Gritzbaugh & Wells
Attys

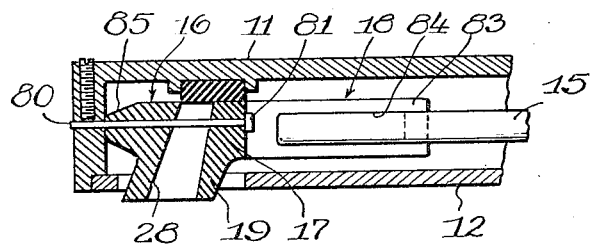
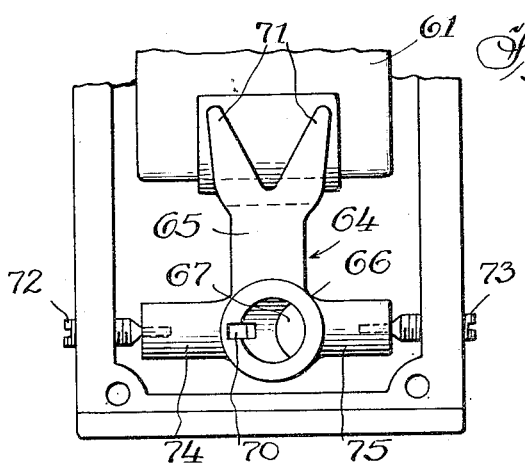
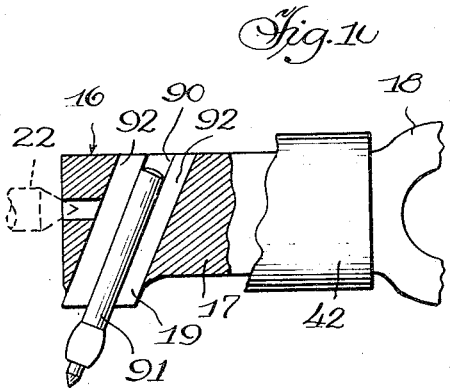
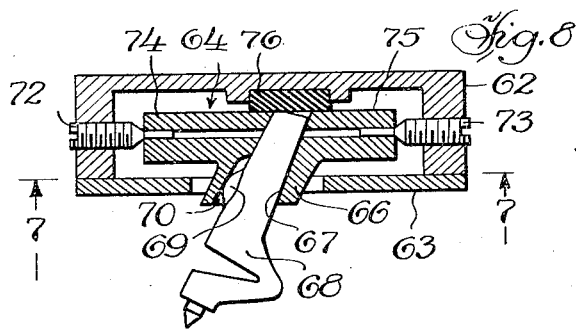
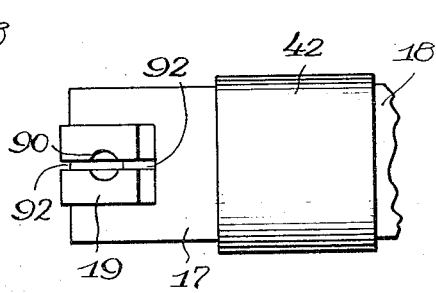
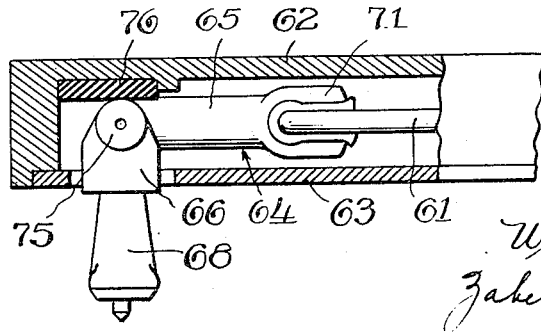

Patented Oct. 12, 1948

2,451,221

UNITED STATES PATENT OFFICE 2,451,221

WEDGED NEEDLE TYPE PHONOGRAPH PICKUP

William H. Hutter, Chicago, Ill.

Application October 30, 1944, Serial No. 561,061

10 Claims. (Cl. 179—100.41)

My invention relates generally to that part of a phonograph which is known as the pick-up, and which is the assembly of parts which causes mechanical vibrations to be converted to a correspondingly fluctuating electric current.

My invention is specifically directed to the construction of the vibration transmitting members, and for purposes of illustration, I have shown herein the application of my invention to a crystal pick-up, although by some slight modifications it may be used with a magnetic or dynamic type or even capacitative type of pick-up. The vibration transmitting members include what is generally known as a needle and a needle supporting member, the function of these elements being to transmit vibrations from the needle point to the crystal, or to other vibration converting devices.

My invention is concerned primarily with a pick-up construction having a low needle point impedance, thus minimizing record wear, needle talk and needle wear. The needle point impedance is generally proportional to the square root of the moment of inertia of the vibration transmitting members.

Heretofore needles have been clamped in the needle supporting member by a screw, which has materially increased the mass of the vibrating system. In order to maintain a low moment of inertia, the screw frequently has been disposed along the axis of rotation; this arrangement necessitates the use of a journal bearing, or otherwise dictates the form, shape and mass of the vibration transmitting members.

It is an object of my invention to provide a construction in which the needle may be associated with the needle-supporting member in operative relationship without materially increasing the moment of inertia of the vibration transmitting members over what the moment would be if the members were formed integrally.

A further objection to the use of a clamping screw which bears against the side of a needle shank received in the bore of a chuck resides in the fact that the contacting surfaces of the needle and the bore of the chuck are comparatively small in extent. This results in a grip which is not secure, and which may permit a small amount of relative motion between the parts, thereby affecting the fidelity of the reproduction.

It is another object of my invention to provide a construction in which the area of contact between the bore of the chuck and the shank of the needle is comparatively extensive as compared with the screw clamping devices above referred to; more specifically, this area of contact should be considerably greater than 180 degrees of the cylindrical or conical surfaces involved, and preferably, this area of contact can approach 360 degrees.

Additional objections to the prior art pick-up constructions resides in the use of a rubber journal for the vibration transmitting member. This rubber journal does not necessarily confine the motion of the shank to a twisting motion, but permits lateral motion as well, which is not transmitted to the crystal or which, if transmitted to the crystal, result in distorted reproduction. The pivot bearing above referred to insures that the lateral undulations of the needle will be transmitted into torsional vibrations of the vibration transmitting member.

Another object is to provide a construction embodying a pivot or other low friction bearing, thereby reducing the impedance of the system and insuring fidelity of reproduction.

A further object is to provide a needle holding construction in which the needle may be maintained in a predetermined angular position with respect to the holding device.

Still another object is to provide an improved means of gripping the crystal so that there will be a minimum of play or rocking between the vibration transmitting members and the crystal.

A still further object is to provide an improved pick-up construction which is characterized by low needle point impedance and by high fidelity.

Various other objects, features and advantages will become apparent as this description proceeds.

With reference now to the drawings in which like reference numerals describe like parts and which form a part of this specification:

Fig. 6 is a section of still another modification;

Fig. 7 is a bottom view taken along the line 7—7 of Fig. 8 showing my invention as applied to a bender type of pick-up cartridge;

Fig. 8 is a section of the cartridge taken along line 8—8 of Fig. 7;

Fig. 9 is a longitudinal section of the cartridge shown in Figs. 7 and 8;

Fig. 10 is a partial section of a modified form of chuck construction; and

Fig. 11 is a bottom view of Fig. 10.

Figure 1:
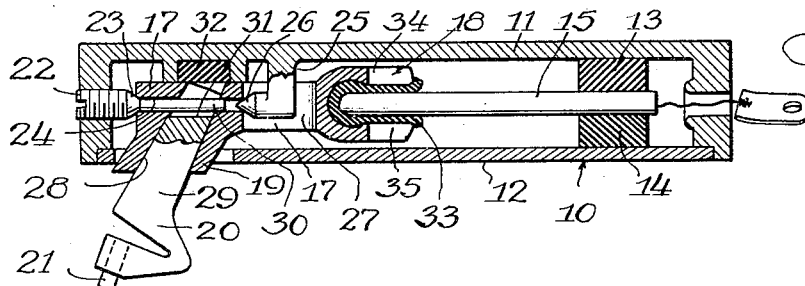
Fig. 1 is a partial section through a pick-up cartridge showing a preferred embodiment of my invention.
Figure 2:
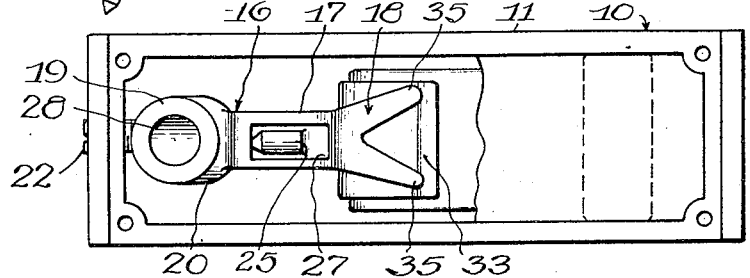
Fig. 2 is a bottom view of the cartridge shown in Fig. 1 with the bottom plate and the needle removed.

With reference now to Figs. 1 and 2, the reference numeral 10 designates generally a pick-up cartridge which comprises a metallic housing 11 having a bottom plate 12 suitably secured thereto. The housing and the bottom plate are provided with abutments 13 and 14, preferably of rubber or like resilient material, which grip one end of a crystal 15. The crystal 15 is a well known element in the phonograph art and need not be described in detail. It is sufficient to say that it comprises two or more layers of Rochelle salt crystals which may be separated by a sheet of tinfoil, the arrangement being such that a piezo-electric effect is evidenced when the crystal is subjected to deformation, as by twisting.

The opposite end of the crystal is engaged by vibration transmitting means referred to generally by the reference numeral 16. This means may include an integral member having a shank 17, a yoke 18, and a chuck 19. The vibration transmitting means also includes a needle 20 which is received in chuck 19. The needle 20 is provided with a point 21 which may be made of any material well known in the art for this particular purpose such examples of such materials being sapphires, other precious stones, and certain long wearing and abrasive resistant metal alloys.

It will be understood that the point engages the groove of a phonograph record and is vibrated back and forth, toward and away from the observer, as viewed in Fig. 1, the vibration of the point being transmitted to the crystal by the vibration transmitting means 16, which includes those elements or portions thereof specifically referred to above.

In the particular arrangement of parts, as shown in Figs. 1 and 2, as well as in Figs. 3 to 6 inclusive, the lateral vibration of needle 20 is transmitted along the shank 17 as a torsional vibration. Therefore means are provided for pivotally mounting the vibration transmitting means 16 along a longitudinal axis, which preferably coincides with the longitudinal axis of the crystal 15. Such mounting means includes a screw 22 which is threaded into the forward wall of housing 11, and which is provided with a conical bearing surface 23. A bore 24 extends through the shank 17 so that the conical bearing surface 23 may engage the shank 17 in the bore. Just rearwardly of the chuck, there is provided a downwardly projecting boss 25 which preferably is integrally formed with the housing 11. The boss is provided with a forwardly extending conical bearing surface 26. A slot 27 is formed in shank 17 to accommodate boss 25. The conical bearing surface 26 projects into the bore 24 and it will be seen that the vibration transmitting means 16 is pivotally mounted between these conical bearing surfaces 23 and 26. A pad 32 is disposed between the vibration transmitting means 16 and the housing 11, and engages both of them, the pad preferably being of a resilient material which will serve to cause the vibration transmitting means to return to a neutral position after displacement thereof to one side or the other by means of the cooperation of the point 21 and a record.

The chuck 19 comprises a bore 28, the bore having slightly tapering or conically shaped walls, which bore is adapted to receive a correspondingly shaped shank 29 of needle 20. Thus it will be seen that the needle 20 may be wedged into the chuck, and it has been found that this provides a very secure mounting for the needle. It will be noted that the bore 28 extends all the way through the shank portion 17 so that the needle can be readily loosened by a slight tap on the upper portion of the shank, after the vibration transmitting means 16 is removed from the housing. This wedging action of the needle in the chuck dispenses with the clamping means heretofore used.

The needle 20 herein shown is of a special shape, which shape, and the characteristics of the needle, are described in greater detail and are claimed in my copending application Serial No. 533,494, filed May 1, 1944, now abandoned. Although this chuck is adapted to receive any type needle having a properly tapered shank the maximum advantages derived from the type of needle shown, as well as certain other types of needle are obtained only when the needle is mounted in a predetermined angular position with respect to the bore of the chuck. Although the frictional engagement between the needle and the chuck is sufficient to maintain the parts in their correct position, I have found that the initial aligning of the needle is facilitated by additional means herein described. In Figs. 1 and 2 it will be noted that the screw 22 has an extension 30 of reduced diameter which extends into the bore 24, and through a slot 31 formed in the upper portion of the shank 29 of the needle 20. This arrangement prevents one from mounting the vibration transmitting means 16 in the housing unless the needle has been correctly aligned with the chuck. On the other hand, the mass of the screw 22 and its extension 30 is not added to the mass of the vibrating system as in the case of a clamp, for these parts are stationary and are secured to the housing.

The yoke 18 which is integrally formed with the shank 17 is bifurcated in a horizontal plane to receive the crystal 15. It will be noted that it is also bifurcated in a vertical plane, thus providing two fingers 34 and two fingers 35 between which the crystal is gripped. This construction provides greater torque transmitting efficiency, and it eliminates the possibility of rocking the yoke with respect to the crystal, which rocking would otherwise occur if the crystal is irregular or if it has a high spot near center which is engaged by the yoke. In other words, the crystal is gripped by two pairs of fingers, and the thickness of the crystal may vary somewhat between the two different gripping points. A folded sheet 33 of rubber is disposed between the yoke 18 and the crystal 15, this member serving to prevent the transmission of such shocks to the brittle crystal as might cause it to crack.

The vibration transmitting means 16, which includes the integral member having portions 17 to 19, inclusive, and which also includes the needle 20, may be made of various suitable materials, although I prefer lightweight materials in order to keep the needle impedance low. Examples of suitable materials are magnesium, aluminum, magnesium or aluminum alloys, and various plastics or synthetic resins. Among the latter, I have found that a copolymer of vinyl chloride, and vinyl acetate gives satisfactory results. I have also found that when plastics or synthetic resins are used, that the wedging action between the needle and the chuck is greatly accentuated. This may be due to a skin effect, or to a cementing action when both the needle and the chuck are made of the same material. The cementing action may be caused by small amounts of plasticizer in the plastic. Irrespective of any theory which may account for this increased wedging action, I have found that plastic against plastic provides for my purposes a superior joint to that formed by metal against metal. Also, the combination of a plastic chuck and a metal needle is superior to a metal chuck and a metal needle.

Figure 3:
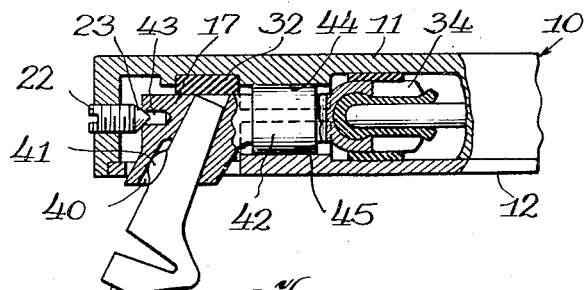
Fig. 3 is a partial section through cartridge showing a modified form of my invention.
Figure 4:
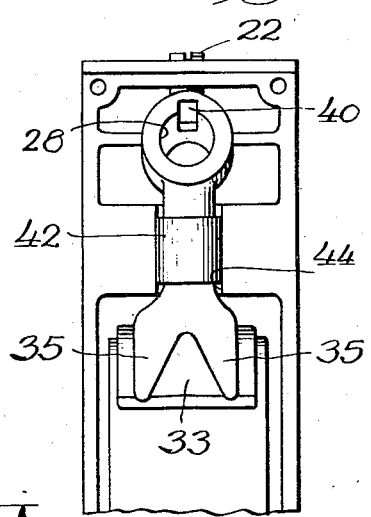
Fig. 4 is a bottom view of Fig. 3 with the needle and bottom plate removed.

In Figs. 3 and 4, I have shown a modified form of construction in which the extension 30 on screw 22, and the bore 31, through the shank are omitted. The reference numerals in these figures which are the same as those used in Figs. 1 and 2, designate corresponding parts, and no further detailed description of the assembly in general is needed. In order to properly align the needle 20 with the chuck 19, the bore 28 in the chuck is provided with a slot 40 which extends only partially through the bore. The needle 20 is provided with a fin 41, or a key which fits into the slot to maintain the correct angular position between the parts.

A further modification present in the construction shown in Figs. 3 and 4 consists in the use of a rubber collar 42 to support the rear end of the shank portion 17, this collar being used instead of the members 25 and 26 shown in Figs. 1 and 2. It will be understood that when the collar 42 is used, the slot 27 is not necessary; also it is not necessary to provide the bore 24 which runs all the way through the shank. The forward edge of the shank 17 is provided with a recess 43 which is engaged by the conical bearing surface 23 of the screw 22. It will be noted that the housing 11 and plate 12 are built up to provide semi-cylindrical recesses 44 and 45, respectively, between which the collar 42 is gripped.

In this construction, the forward end of the shank 17 is supported by a low friction bearing and the rearward end is supported by a journal in the form of a flexible rubber collar 42. The collar has sufficient flexibility as to permit torsional vibration of the vibration transmitting means 16.

Figure 5:
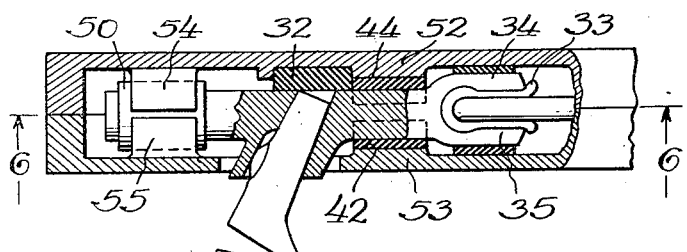
Fig. 5 is a partial section showing a still further modification.

Fig. 5 shows my improved chuck construction as applied to the more usual journal type of construction in which the shank portion 17 is supported both at its front and at its rear by rubber collars 50 and 42, respectively. The collar 50 is substituted for the screw 22 of Figs. 1 and 4, inclusive. In this construction, the cartridge instead of being constructed of a housing and a plate member, is constructed of upper and lower sections 52 and 53 which are of approximately the same dimensions, the forward end of each of the sections being provided with semi-cylindrical recesses 54 and 55, respectively, to accommodate the rubber collar 50. In other respects the sections 52 and 53 are similar to housing 11 and plate 12.

In Fig. 6 I have shown a modified form of that embodiment of my invention which is shown in Figs. 1 and 2. In this form it will be noted that the boss 25 and the conical bearing surface 26 are omitted, and vibration transmitting means 16 is pivotally mounted on a longitudinal member 80, which corresponds to the extension 30 of Fig. 1. The longitudinal member 80 may be formed from a piece of piano wire which is headed over at 81, and which extends through the front wall of the housing 10 and which is secured in position by a set screw 82. In this construction, the mass of the vibration transmitting means 16 is very considerably reduced, and therefore the moment of inertia is reduced. The yoke 18 is of a somewhat different form, the arms 83 of which are slotted at 84 to receive the corners of the crystal, the slots terminating short of the ends of the arms. The forward portion of the shank 17 is conically shaped as indicated by the reference numeral 85, and abuts against the forward wall of the housing 11, whereby the longitudinal position of the vibration transmitting means 16 is fixed.

The chuck 19 is provided with a tapering needle receiving bore 28, such as shown in connection with Figs. 1 and 2.

The longitudinal member 80 may be provided with a coating of colloidal graphite to reduce friction.

In Figs. 7, 8 and 9, I show the application of my invention to a "bender" type pick-up, in which the cartridge 60 has mounted therein a "bender" crystal 61 by suitable clamping means, not shown. The cartridge 60 comprises a housing 62 and a bottom plate 63. Within the housing is mounted vibration transmitting means 64 which include a T-shaped member 65 and a needle 68. The T-shaped member 65 is provided with a downwardly opening chuck portion 66 which is provided with a tapered bore 67. The needle 68 is provided with a fin 69 which fits into a slot 70 in the bore 67. The shank of the needle is tapered as pointed out in connection with Figs. 1 and 2 so as to result in a secure wedging action between the parts. The T-shaped member 65 also includes a yoke 71 which grips the crystal 61.

The vibration transmitting means 64 are supported by means of screws 72 and 73 which extend through the side walls of housing 62 and which have conical bearing surfaces which engage the ends of the opposite arms 74 and 75 of the T-shaped member 65. A suitable pad 76 is disposed between the top wall of the housing member and the T-shaped member to cause restoration of the vibration transmitting means to neutral position.

Looking at Fig. 8, the record groove will cause vibration of the needle 68 toward and away from the observer, thereby causing a rocking of the T-shaped member, and a bending of the crystal 61. The longitudinal axis of the crystal in Figs. 7, 8 and 9 is disposed generally radially of the phonograph record, whereas the longitudinal axis of the crystal 15 in the other figures is disposed substantially parallel to a tangent at the point of engagement of the groove by the needle 20.

In Figs. 10 and 11, I have shown a modified form of chuck in which a cylindrical bore 90 is used rather than the tapering bore 28. This type of chuck is designed to be used with a needle 91 of the usual dimensions, and preferably a needle having a plastic shank, such as that disclosed and claimed in my copending application 529,269, filed April 3, 1944.

The plastic chuck is provided with diametrically opposed slots 92 which impart a certain amount of resilience thereto, thereby permitting the use of a bore which has a diameter of a few thousandths less than the diameter of the shank of a needle. The proper gripping action is thereby maintained without the use of complementary tapering elements, for the reason that contact is maintained with practically the entire circumference of the needle shank.

It will be seen that in all of the forms of my invention hereinabove shown and described, a simple and lightweight construction is shown by means of which the needle may be secured within the chuck. Inasmuch as the needle and the member which supports it form a part of one vibrating system, it is desirable to provide a securing means which affords the maximum area of contact between the two separate parts.

This is especially important in transmitting vibrations of high frequency and low amplitude, which vibrations are not transmitted in the previously known constructions, due to the fact that the chuck hole is larger than the needle, and the pressure on the needle is concentrated at one point of the clamping screw. Furthermore, in the prior art constructions the clamping screw has generally been disposed at the axis of rotation where the extent of vibration is the smallest.

In the construction herein shown and described, the gripping action of the chuck upon the needle extends a considerable distance away from the axis of rotation. This provides a much more efficient vibration transmitting coupling.

Furthermore, this secure coupling is obtained without any substantial increase in the mass of the parts, thereby contributing to low needle point impedance, and consequently a small amount of wear on the record.

It will be noted that the elimination of the usual concentric screw threaded clamping means permits the use of the pivoted bearing construction. This construction not only contributes to lower impedance, but also eliminates any tendency of the shank to vibrate laterally instead of torsionally. Furthermore, the use of the pivoted construction eliminates the additional mass necessitated by the extension of the shank to provide a journal for the rubber collars. This latter construction is shown in Fig. 5, and a comparison of Fig. 5, which exemplifies the prior art in this respect, with Fig. 1, illustrates graphically decrease in mass which may be achieved by the pivoted construction.

The construction of the yoke 18, which in each instance comprises two pairs of oppositely disposed gripping fingers, disposed on opposite sides of the longitudinal axis of the crystal, provides not only a torque transmitting coupling of increased efficiency but also eliminates any rocking or play which might result from irregularities in the surface of the crystal.

Although I have shown only preferred embodiments of my invention, it will be understood that various modifications and changes may be made therein without departing from the spirit of my invention. The foregoing description and the drawings are deemed to be illustrative only, and my invention is to be limited only by the appended claims.

I claim:

1. In a pick-up unit, two vibration transmitting members, one of which comprises an elongate member provided with a chuck portion having an inwardly tapering bore, said bore being disposed at an angle to the axis of said elongate member, and the other of which comprises a member provided with a record engaging point and provided with an outwardly tapering shank portion, said members being wedged one within the other.

2. In a phonograph pick-up, two vibration transmitting members, one of which comprises a horizontally disposed member for transmitting torsional vibrations and including a chuck portion having a downwardly extending upwardly tapering bore, the other of said vibration transmitting members comprising a needle having an upwardly tapering shank portion, said members being wedged one within the other, and mounting means for said first mentioned vibration transmitting member, to permit torsional vibration thereof.

3. In a phonograph pick-up having a housing and a crystal the combination of a stationary pivot mounted in a wall of said housing, and a longitudinally disposed vibration transmitting member one end of which engages said crystal, and the other end of which is mounted on and surrounds said pivot so as to permit a torsional vibration of said vibration transmitting member and the transmission of said vibrations along its longitudinal axis, to said crystal, said pivot being sufficiently rigid as to prevent any lateral vibration of said vibration transmitting member with respect to said housing.

4. In a phonograph pick-up, a housing, a pivot member projecting from one wall thereof, a vibration transmitting member having an axial recess into which said pivot member extends so as to be pivotally mounted on said pivot member, said vibration transmitting member having a downwardly extending upwardly tapering bore which intersects said pivot, and a needle having an upwardly tapering shank disposed within said bore, in wedging relationship the upper end of said needle being slotted so that said upper end may extend beyond and embrace said pivot member, to orient said needle in a predetermined direction.

5. In a crystal pick-up unit, two vibration transmitting members, one of which comprises a horizontally disposed elongate member provided with a chuck portion having an upwardly tapering downwardly facing bore disposed at an angle to the axis of said elongate member, and the other of which is provided with an upwardly tapering shank portion, said members being wedged one within the other, said first mentioned vibration transmitting member including a crystal engaging yoke which is bifurcated vertically as well as horizontally so as to provide a plurality of pairs of oppositely disposed crystal grippping fingers.

6. In a crystal pick-up unit, a housing having a conical bearing member adjustably mounted in a wall thereof, a vibration transmitting member engaged at one end by said conical bearing member and rotatably supported thereby, a crystal engaging yoke portion forming a part of said vibration transmitting member and disposed at the other end thereof, and means adjacent said yoke portion for rotatably supporting said vibration transmitting member.

7. A crystal pick-up unit comprising a housing having a downwardly projecting lug provided with a forwardly facing conically shaped bearing member, an adjustable rearwardly facing conically shaped bearing member mounted in the forward wall of said housing, and a vibration transmitting member disposed within said housing and provided with a slot into which said downwardly projecting lug extends whereby said vibration transmitting member may be supported at its forward end and at an intermediate portion by said conically shaped bearing members.

8. A pick-up assembly comprising a housing formed in separable parts, a crystal disposed therein, one end of which is gripped in supporting relationship by the parts of said housing, a vibration transmitting member independently mounted in said housing for oscillation about a longitudinal axis, one end of said member being provided with an integrally formed yoke bifurcated in two planes forming fingers for gripping the free end of said crystal, said member including a downwardly extending chuck member having an upwardly tapering bore, and a needle provided with an upwardly tapering shank wedged in said tapering bore in a manner such that lateral vibration of the point of said needle will cause oscillation of said member, and means for mounting said member in said housing in a manner such as to permit oscillation of said member.

9. A pick-up unit as claimed in claim 1, in which said chuck portion is extended outwardly in the vicinity of said tapering bore to provide a depending skirt portion which constitutes an outward extension of said inwardly tapering bore whereby a greater area of contact is provided between said members.

10. A pick-up unit as claimed in claim 1, in which said chuck portion is provided with a radially disposed slot in the wall of said tapering bore, and in which said tapering shank portion is provided with a radially disposed fin for cooperating with said bore to orient said shank portion.

WILLIAM H. HUTTER.

REFERENCES CITED

The following references are of record in the file of this patent:

UNITED STATES PATENTS

| Number | Name | Date |
|---|---|---|
| 1,022,515 | Tendler | Apr. 9, 1912 |
| 1,149,514 | Hiles | Aug. 10, 1915 |
| 1,760,647 | Hopkins | May 27, 1930 |
| 2,072,610 | Van Urk | Mar. 2, 1937 |
| 2,326,280 | Bauer | Aug. 10, 1943 |
| Re.22,371 | Delly | Sept. 7, 1943 |

FOREIGN PATENTS

| Number | Country | Date |
|---|---|---|
| 849,531 | France | Nov. 25, 1939 |
| 355,227 | Great Britain | Aug. 17, 1931 |